United States Patent
Yamamoto

(10) Patent No.: US 10,714,961 B2
(45) Date of Patent: Jul. 14, 2020

(54) POWER SUPPLY APPARATUS, CONTROL APPARATUS, AND CONTROL METHODS THEREOF

(71) Applicant: CANON KABUSHIKI KAISHA, Tokyo (JP)

(72) Inventor: Yukinori Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

(21) Appl. No.: 15/862,750

(22) Filed: Jan. 5, 2018

(65) Prior Publication Data
US 2018/0205259 A1 Jul. 19, 2018

(30) Foreign Application Priority Data
Jan. 13, 2017 (JP) .................. 2017-004605

(51) Int. Cl.
| | | |
|---|---|---|
| *H02J 7/02* | (2016.01) | |
| *H02J 5/00* | (2016.01) | |
| *H02J 50/12* | (2016.01) | |
| *H02J 50/40* | (2016.01) | |
| *H02J 50/70* | (2016.01) | |
| *H02J 50/80* | (2016.01) | |

(52) U.S. Cl.
CPC .............. *H02J 7/025* (2013.01); *H02J 5/005* (2013.01); *H02J 50/12* (2016.02); *H02J 50/40* (2016.02); *H02J 50/70* (2016.02); *H02J 50/80* (2016.02)

(58) Field of Classification Search
None
See application file for complete search history.

(56) References Cited

U.S. PATENT DOCUMENTS

2010/0225172 A1* 9/2010 Kozuma ................. H02J 5/005
                                                        307/104
2011/0260532 A1* 10/2011 Tanabe .................. H01M 10/44
                                                         307/17

FOREIGN PATENT DOCUMENTS

JP        2015-180177 A     10/2015

* cited by examiner

*Primary Examiner* — Jared Fureman
*Assistant Examiner* — Aqeel H Bukhari
(74) *Attorney, Agent, or Firm* — Cowan, Liebowitz & Latman, P.C.

(57) ABSTRACT

A power supply apparatus which can supply electrical power to a power reception apparatus in a non-contact manner, the power supply apparatus comprises a communication unit configured to be communicably connected to a control apparatus; a power supply unit configured to be able to output first electrical power to be supplied to a power source of the power reception apparatus and second electrical power that is smaller than the first electrical power, and is to be supplied to a communication unit of the power reception apparatus; and a control unit configured to control output of the second electrical power based on a control signal that has been received from the control apparatus, and is for performing control such that the second electrical power is not output from a plurality of power supply apparatuses at the same time.

20 Claims, 7 Drawing Sheets

POWER SUPPLY APPARATUS, CONTROL APPARATUS, AND CONTROL METHODS THEREOF

BACKGROUND OF THE INVENTION

Field of the Invention

The present invention relates to a non-contact power supply system in which electrical power is supplied from a power supply apparatus to a power reception apparatus in a non-contact manner.

Description of the Related Art

In recent years, non-contact power supply systems are known in which electrical power is transmitted/received in a non-contact manner by an electromagnetic induction method, a magnetic resonance method, or the like, without connecting a power reception apparatus to a power supply apparatus by wire in a non-contact power supply system, a range in which wireless communication is possible is larger than a range in which power supply is possible, and thus in a case where power reception apparatuses are respectively arranged in a plurality of power supply apparatuses in the range in which wireless communication is possible, there is a possibility that communication connection between a power supply apparatus and a power reception apparatus that is other than a power reception apparatus arranged in the power supply apparatus is established erroneously. Japanese Patent Laid-Open No. 2015-180177 discloses a method for specifying whether or not a power reception apparatus connected to a power supply apparatus is a correct power reception apparatus (a power reception apparatus arranged in the power supply apparatus).

However, in the above Japanese Patent Laid-Open No. 2015-180177, in a case where a power reception apparatus that has been connected to a power supply apparatus is not a power reception apparatus arranged in the power supply apparatus, it is required to repeatedly perform an operation of disconnecting and reconnecting until communication connection with the power reception apparatus arranged in the power supply apparatus is established.

SUMMARY OF THE INVENTION

The present invention has been made in consideration of the aforementioned problems, and realizes a technique for performing control such that, in a plurality of power supply apparatuses and a plurality of power reception apparatuses, communication connection can be more smoothly established between a power supply apparatus and a power reception apparatus arranged in the power supply apparatus.

In order to solve the aforementioned problems, the present invention provides a power supply apparatus which can supply electrical power to a power reception apparatus in a non-contact manner, the power supply apparatus comprising: a communication unit configured to be communicably connected to a control apparatus; a power supply unit configured to be able to output first electrical power to be supplied to a power source of the power reception apparatus and second electrical power that is smaller than the first electrical power, and is to be supplied to a communication unit of the power reception apparatus; and a control unite, configured to control output of the second electrical power based on a control signal that has been received from the control apparatus, and is for performing control such that the second electrical power is not output from a plurality of power supply apparatuses at the same time.

In order to solve the aforementioned problems, the present invention provides a control apparatus comprising: a communication unit configured to communicate with a plurality of power supply apparatuses that can supply electrical power to respective power reception apparatuses in a non-contact manner; and a control unit configured to output a control signal for performing control such that electrical power that is supplied in order to connect the power supply apparatuses to the respective power reception apparatuses is not output from the power supply apparatuses at the same time.

In order to solve the aforementioned problems, the present invention provides a control method of a power supply apparatus which can output, in a non-contact manner, first electrical power to be supplied to a power source of a power reception apparatus and second electrical power that is smaller than the first electrical power, and is to be supplied to a communication unit of the power reception apparatus, the method comprising: communicating with a control apparatus, and controlling output of the second electrical power based on a control signal that has been received from the control apparatus, and is for performing control such that the second electrical power is not output from a plurality of power supply apparatuses at the same time.

In order to solve the aforementioned problems, the present invention provides a control method of a control apparatus which controls a plurality of power supply apparatuses that can supply electrical power to respective power reception apparatuses in a non-contact manner, the method comprising: communicating with the plurality of power supply apparatuses; and outputting a control signal for performing control such that electrical power that is supplied in order to connect the power supply apparatuses to the respective power reception apparatuses is not output from the power supply apparatuses at the same time.

In order to solve the aforementioned problems, the present invention provides a computer-readable storage medium storing a program for causing a computer to function as a power supply apparatus which can supply electrical power to a power reception apparatus in a non-contact manner, the power supply apparatus comprising: a communication unit configured to be communicably connected to a control apparatus; a power supply unit configured to be able to output first electrical power to be supplied to a power source of the power reception apparatus and second electrical power that is smaller than the first electrical power, and is to be supplied to a communication unit of the power reception apparatus; and a control unit configured to control output of the second electrical power based on a control signal that has been received from the control apparatus, and is for performing control such that the second electrical power is not output from a plurality of power supply apparatuses at the same time.

In order to solve the aforementioned problems, the present invention provides a computer-readable storage medium storing a program for causing a computer to function as a control apparatus comprising: a communication unit configured to communicate with a plurality of power supply apparatuses that can supply electrical power to respective power reception apparatuses in a non-contact manner; and a control unit configured to output a control signal for performing control such that electrical power that is supplied in order to connect the power supply apparatuses to the respective power reception apparatuses is not output from the power supply apparatuses at the same time.

According to the present invention, control can be performed such that, in a plurality of power supply apparatuses and a plurality of power reception apparatuses, communication connection between a power supply apparatus and a power reception apparatus arranged in the power supply apparatus can be established more smoothly.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

System Configuration

First, the configuration of a non-contact power supply system of this embodiment will be described with reference to FIG. 1.

The non-contact power supply system of this embodiment can supply electrical power to a power reception apparatus 200 that is in the range of a region A in which a power supply apparatus 100 can supply power, by wireless power supply, without wired connection. In wireless power supply, electromagnetic wave that is emitted from an antenna of the power supply apparatus 100 is received by an antenna of the power reception apparatus 200, and thereby power is transmitted/received. In addition, in the non-contact power supply system, various types of information such as a parameter used for power supply control are transmitted/received between the power supply apparatus 100 and the power reception apparatus 200 by wireless communication.

Figure 1:
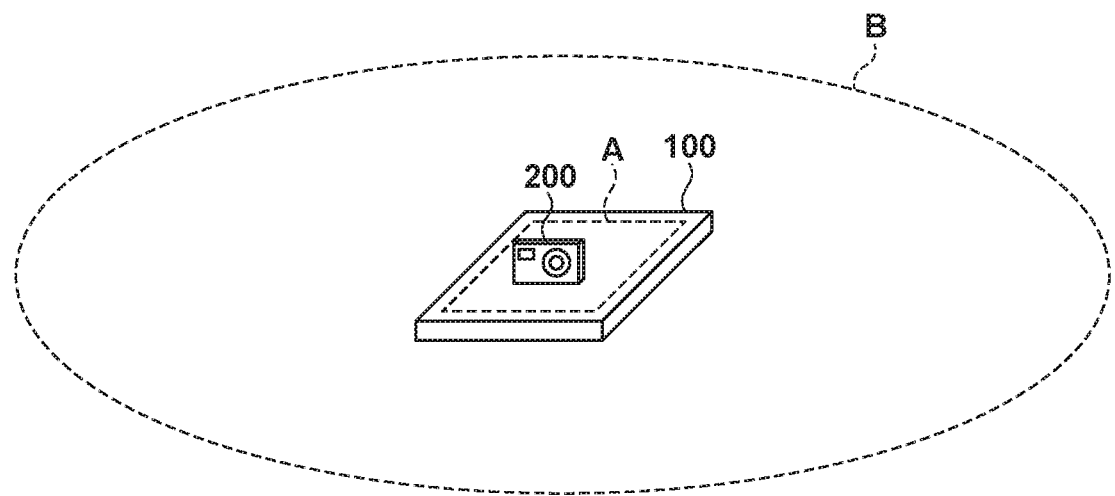
FIG. 1 is a diagram showing a system configuration of an embodiment of the invention.

As shown in FIG. 1, in a case where the power reception apparatus 200 is detected in the range of the region A which the power supply apparatus 100 can supply power, the power supply apparatus 100 performs wireless communication with the power reception apparatus 200, and after authenticating the power reception apparatus 200, starts supplying power. Note that a range in which wireless communication can be performed between the power supply apparatus 100 and the power reception apparatus 200 is a region B in FIG. 1, and is larger than the region A in which power supply is possible.

Note that the power reception apparatus 200 of this embodiment, may be an image capturing apparatus such as a digital camera, a communication terminal such as a mobile phone or a smartphone that is a type of a mobile phone, or an electronic device such as a mobile player that reproduces sound and video, or alternatively, a mouse or a speaker.

Apparatus Configuration

Figure 2A:
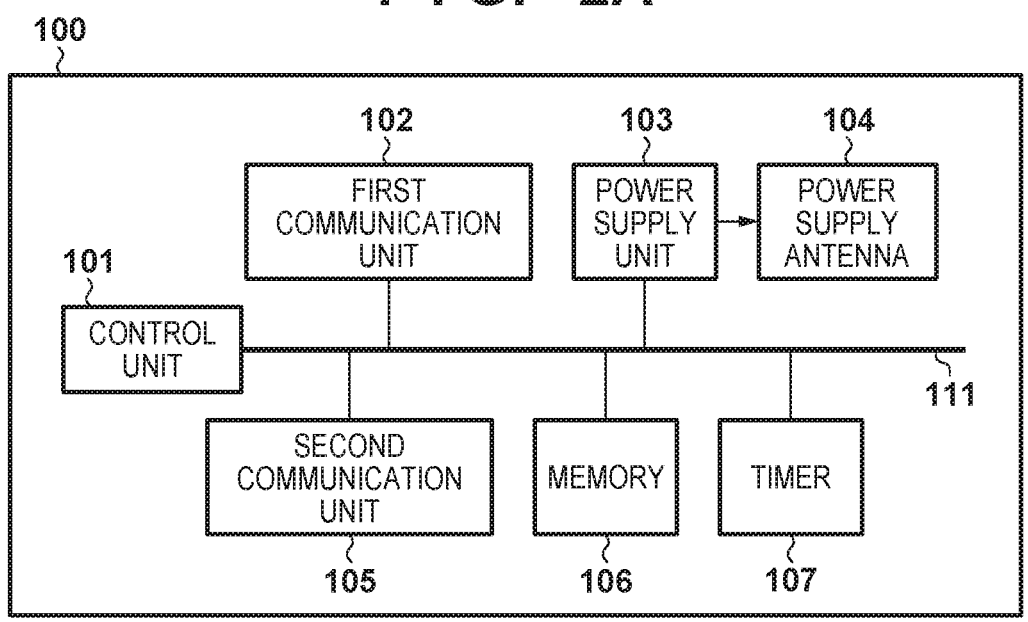
FIGS. 2A to 2C are block diagrams showing an apparatus configuration of the embodiment.
Figure 2B:
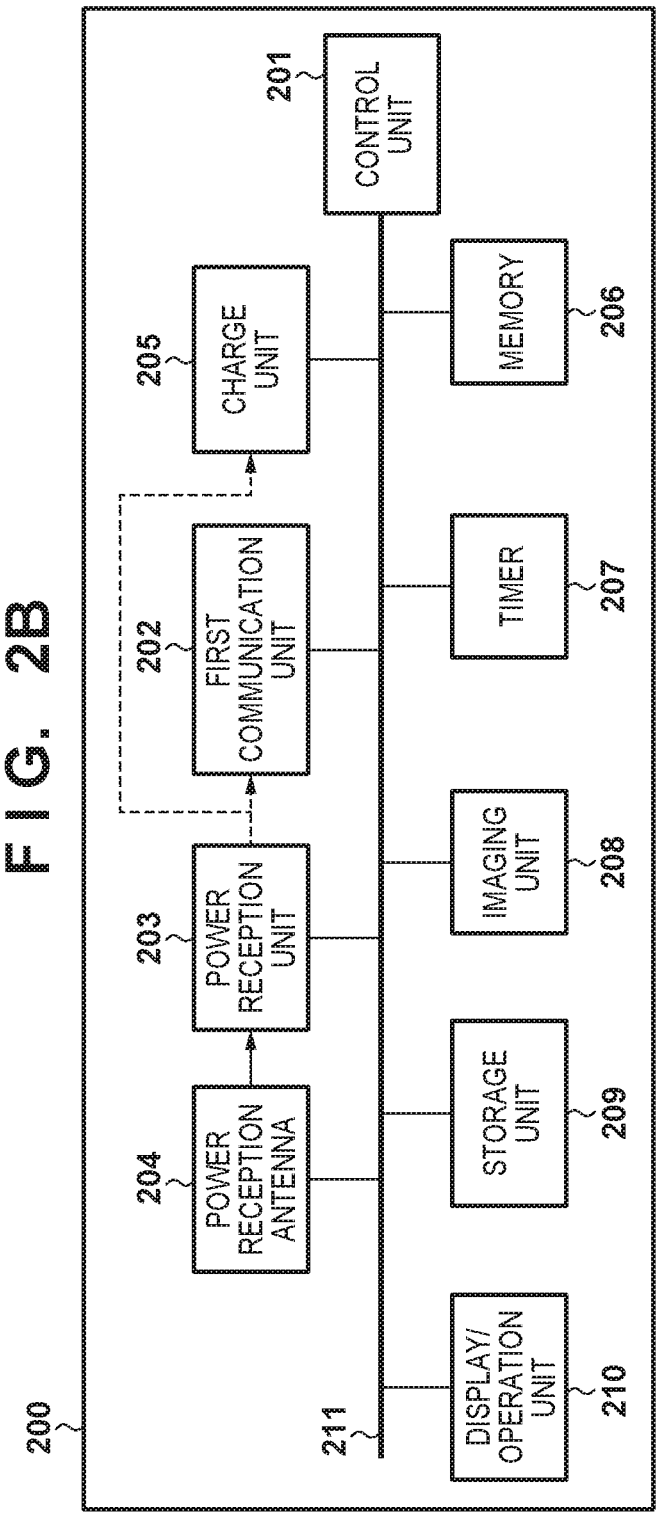
Figure 2C:
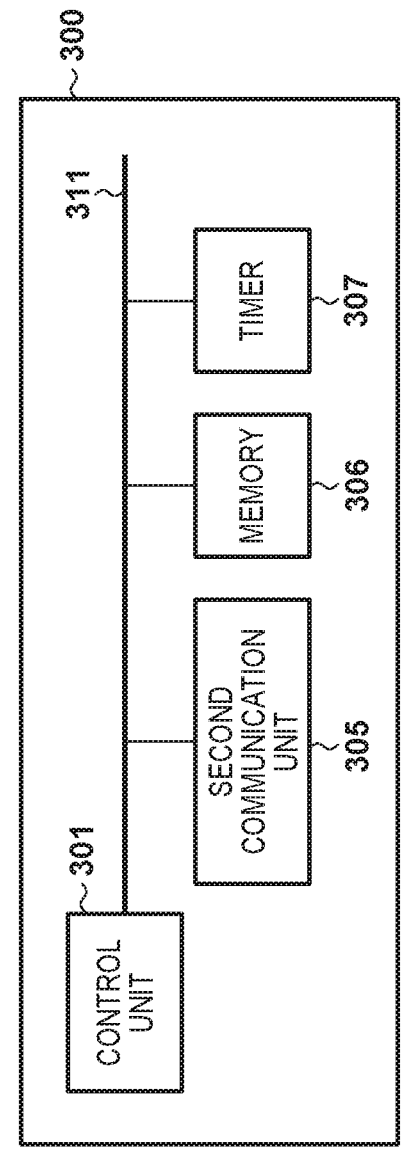

Next, the configuration of a power supply apparatus and a power reception apparatus in the non-contact power supply system of this embodiment will be described with reference to FIGS. 2A to 2C.

First, the configuration of the power supply apparatus 100 of this embodiment will be described with reference to FIG. 2A.

The power supply apparatus 100 has a control unit 101, a first communication unit 102, a power supply unit 103, a power supply antenna 104, a second communication unit 105, a memory 106, a timer 107, and a bus 111.

The control unit 101 includes an arithmetic processing apparatus such as a CPU, and by executing a control program stored in the memory 106, performs overall control of the power supply apparatus 100. Control regarding power supply of this embodiment will be described later in detail.

The first communication unit 102 can perform wireless communication that is based on the IEEE 802.15 standard or the like, and exchanges data regarding wireless power supply with the power reception apparatus 200. Operations of the first communication unit of this embodiment will be described later in detail.

The power supply unit 103 amplifies an AC signal, and supplies AC power to the power reception apparatus 200 via the power supply antenna 104 in a non-contact manner. Also, the power supply unit 103 has a function for being able to change the level of electrical power that is output from the power supply antenna 104, to at least three stages. Respective uses of the power levels will be described later.

The power supply antenna 104 is a looped antenna, outputs, in the air, AC power that is output from the power supply unit 103, and supplies the AC power to a power reception antenna 204 of the power reception apparatus 200 in a non-contact manner.

The second communication unit 105 can perform wired or wireless communication with a control apparatus 300 to be described later. In a case of wired communication, power line communication (PLC), a wired LAN (the IEEE 802.3 standard) or the like is used as will be described later. In a case of wireless communication, a communication method such as the IEEE 802.11 standard (a wireless LAN) or the IEEE 802.15 standard is used. Operations of the second communication unit of this embodiment will be described later in detail.

The memory 106 is a storage unit such as a ROM that is a non-volatile memory or a RAM that is a volatile memory, and stores programs that are executed by the control unit 101 and various types of data.

The timer 107 includes an oscillator, and notifies the control unit 101 of various timings for controlling power supply, by counting the output of the oscillator. Here, an external timer is used, but timings may be generated in the control unit 101 using a program.

The bus 111 connects the control unit 101 to constituent blocks, and is used for the control unit 101 to control the constituent blocks and exchange necessary data with the constituent blocks.

Next, the configuration of the power reception apparatus 200 of this embodiment will be described with reference to FIG. 2B.

The power reception apparatus 200 has a control unit 201, a first communication unit 202, a power reception unit 203, the power reception antenna 204, a charge unit 205, a memory 206, a timer 207, an imaging unit 208, a storage unit 209, a display/operation unit 210, and a bus 211.

The control unit 201 includes an arithmetic processing apparatus such as a CPU, and performs overall control of the power reception apparatus 200 by executing a control program stored in the memory 206.

The first communication unit 202 can perform wireless communication that is based on the IEEE 802.15 standard or the like, and exchanges data regarding wireless power supply with the power supply apparatus 100. In this embodiment, a configuration is adopted in which power is supplied from the power reception unit. 203 as a power source of the first communication unit 202. Power has not been supplied from an internal power source such as a battery of the power reception apparatus 200 to the first communication unit 202, unlike other blocks, and thus only when the power reception apparatus 200 is arranged in the range of the region A in which the power supply apparatus 100 can supply power, and power is supplied from the power supply apparatus 100 wirelessly, the first communication unit 202 can perform an operation (communication). Operations of the first communication unit 202 of this embodiment will be described later in detail.

The power reception unit 203 rectifies and smoothes a radio wave received by the power reception antenna 204 so as to take out electrical power, and supplies the electrical power to the first communication unit 202 and the charge unit 205.

The power reception antenna 204 is a looped antenna, and receives electrical power that is output from the power supply antenna 104 of the power supply apparatus 100.

The charge unit 205 includes a chargeable secondary battery such as a lithium-ion or a nickel-hydrogen battery, as the internal power source of the power reception apparatus 200, and charges the secondary battery using electrical power received from the power supply apparatus 100 via the power reception unit 203.

The memory 206 is a storage unit such as a ROM that is a non-volatile memory or a RAM that is a volatile memory, and stores programs that are executed by the control unit 201 and various types of data.

The timer 207 includes an oscillator, and notifies the control unit 201 of various timings for controlling power supply, by counting the output of the oscillator. Here, an external timer is used, but timings may be generated in the control unit 201 using a program.

The imaging unit 208 has an optical lens, an image sensor such as a CMOS image sensor, a lens control unit, an image processing unit, and the like, and performs operations from capturing a moving image or a still image to recording the image.

The storage unit 209 includes a recording medium that is detachable from the power reception apparatus 200, such as a flash memory, and records moving images and still images acquired by the imaging unit 208.

The display/operation unit 210 includes a display device such as a liquid crystal panel and an operation member such as a touch panel, displays a moving image, a still image and the state of the power reception apparatus 200, receives a user operation on the touch panel, and sends the user operation to the control unit 201.

The bus 211 connects the control unit 201 to constituent blocks, and is used for the control unit 201 to control the constituent blocks and exchange necessary data with the constituent blocks.

Next, the configuration of the control apparatus 300 of this embodiment will be described with reference to FIG. 2C.

The control apparatus 300 has a control unit 301, a second communication unit 305, a memory 306, a timer 307, and a bus 311.

The control unit 301 includes an arithmetic processing apparatus such as a CPU, and performs overall control of the control apparatus 300 by executing a control program stored in the memory 306.

The second communication unit 305 is connected to all the power supply apparatuses 100 in the system in this embodiment, and can perform wired or wireless communication. In a case of wired communication, power line communication (PLC), a wired LAN (the IEEE 802.3 standard) or the like is used as will be described later. In a case of wireless communication, a communication method such as the IEEE 802.11 standard (a wireless LAN) or the IEEE 802.15 standard is used. Operations of the second communication unit of this embodiment will be described later in detail.

The memory 306 is a storage unit such as a ROM that is a non-volatile memory or a RAM that is a volatile memory, and stores programs that are executed by the control unit 301 and various types of data.

The timer 307 includes an oscillator, and notifies the control unit 301 of various timings for controlling power supply, by counting the output of the oscillator. Here, an external timer is used, but timings may be generated in the control unit 301 using a program.

The bus 311 connects the control unit 301 to constituent blocks, and is used for the control unit 301 to control the constituent blocks and exchange necessary data with the constituent blocks.

Note that processing that is executed by the control apparatus 300 is very simple processing as will be described later, and thus the CPU of the control unit 301 can be omitted.

Connection Relationship Between Power Supply Apparatus and Control Apparatus

Figure 3A:
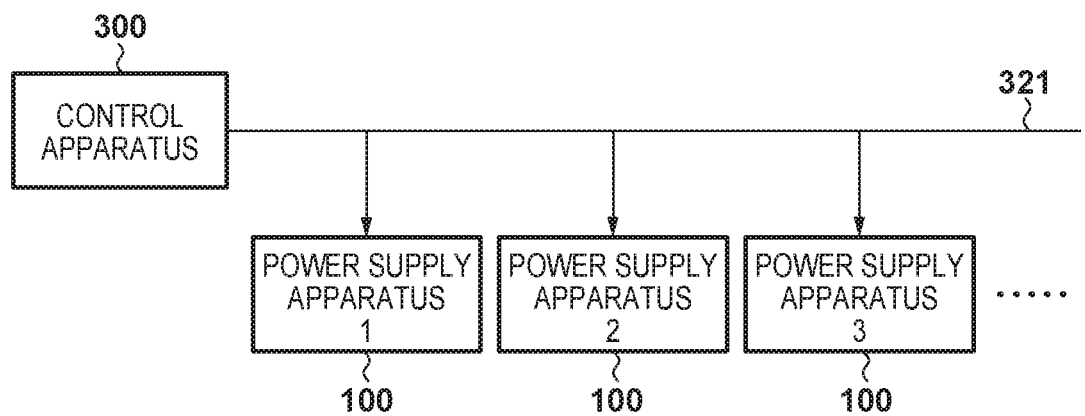
FIGS. 3A and 3B are diagrams showing a system configuration of a control apparatus and power supply apparatuses of the embodiment.

FIG. 3A shows the connection relationship between the power supply apparatuses 100 and the control apparatus 300 in the system of this embodiment.

The control apparatus 300 is connected to ail the power supply apparatuses 100 using a shared signal line 321.

The control apparatus 300 transmits a common control signal to the power supply apparatuses 100 connected via the signal line 321, and the power supply apparatuses 100 control operations of themselves according to this control signal. Specific control will be described later in detail. The signal line 321 may be wired, or may be wireless. It is desirable that an additional signal line such as a dedicated line is not required, considering the cost. For example, if the power supply apparatus 100 has a commercial (AC) power source, it is conceivable that a control signal is transmitted by power line communication (PLC) in which a power supply cable is used. A case is also conceivable in which, for the purpose of exchange and management of information unrelated to power supply, the power supply apparatus 100 is equipped with a wired LAN or a wireless LAN. In this case, it is conceivable that a control signal in this embodiment is included as communication packet data. Furthermore, a control signal can also be received by additionally using the first communication unit 102 described with reference to FIG. 2A. In this case, it is possible to omit the second communication unit 105 for receiving a control signal.

Figure 3B:
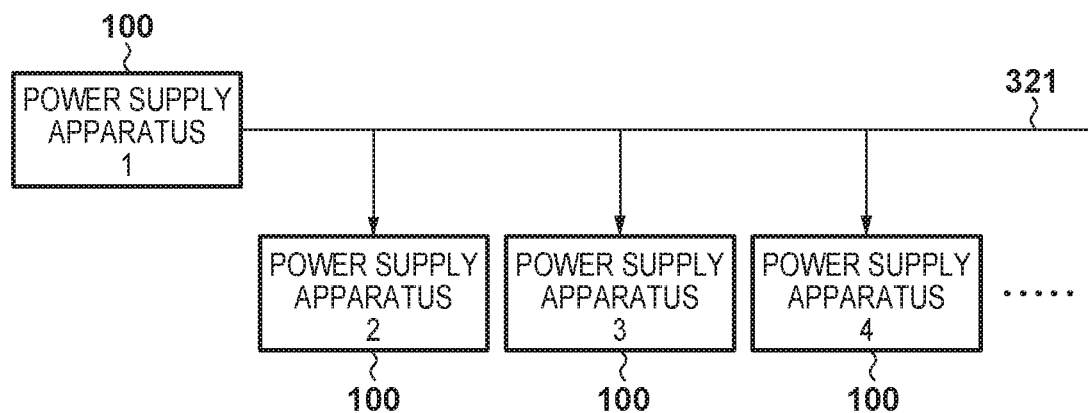

FIG. 3B shows the connection relationship in a case where functions of the control apparatus 300 are implemented in the power supply apparatus 100 of this embodiment. The processing load when the power supply apparatus 100 operates as the control apparatus 300 is relatively small, and thus a configuration may be adopted in which all the functions of the control apparatus 300 are implemented in the power supply apparatus 100, and the power supply apparatus 100 is operated as both the control apparatus 300 and the power supply apparatus 100. In the illustrated example, a configuration is adopted in which a power supply apparatus 1 operates as the control apparatus 300 so as to control other power supply apparatuses 2, 3, 4, etc. The power supply apparatus 1 can operate as the power supply apparatus 100 by using, also in the power supply apparatus 1, a time slot number TSN or a synchronization signal that is generated in the power supply apparatus 1 and transmitted to other power supply apparatuses 2, 3 and 4.

Here, in a case where a restaurant or the like is envisioned as a specific application example of the system of this embodiment, a system is conceivable in which a power supply apparatus is provided for each table in the restaurant, and when a power reception apparatus such as a mobile phone of a customer is arranged in the power supply apparatus, the customer can enjoy charging service.

Note that a control signal that is transmitted from the control apparatus 300 to the power supply apparatuses 100 via the signal line 321 will be described later in detail.

Power Supply Processing

Next, a basic flow of power supply processing in a pair of the power supply apparatus 100 and the power reception apparatus 200 will be described with reference to FIGS. 4A to 4G.

In power supply processing of this embodiment, the level of electrical power that is output from the power supply apparatus 100 changes to three stages over time. The level of electrical power that is output by the power supply apparatus 100 takes at least values of the three stages, namely, first electrical power P1, second electrical power P2, and third electrical power P3, which are in the relationship of P1>P2>P3. As will be described below, the power supply apparatus 100 controls the electrical power level according to the purpose and conditions of power supply processing.

Figure 4A:
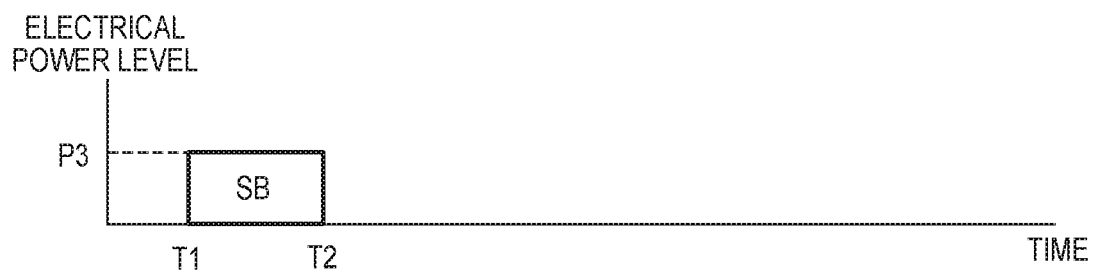
FIGS. 4A to 4C are diagrams illustrating the level of electrical power that is output from the power supply apparatus of the embodiment.
Figure 4B:
Figure 4C:
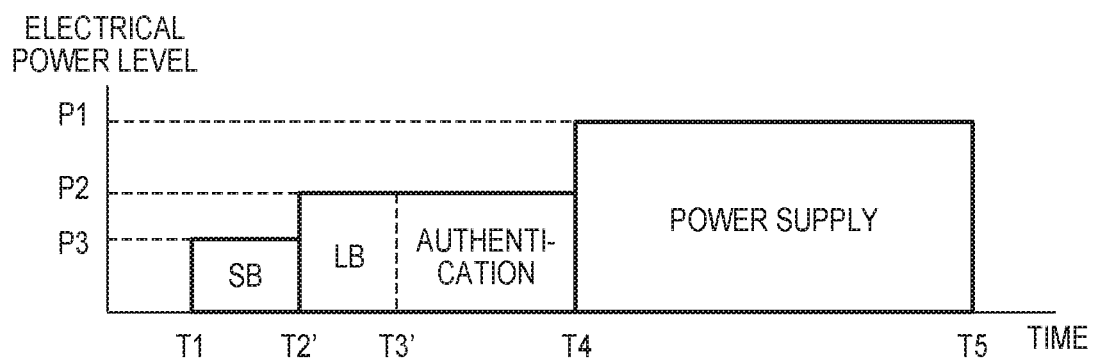

The horizontal axis in FIGS. 4A to 4C indicates time, and the vertical axis indicates electrical power level. A state is shown in which the level of electrical power that is output by the power supply apparatus 100 changes as the power supply processing proceeds from FIG. 4A to FIG. 4C over time.

FIG. 4A shows the third electrical power P3 that is small, is output during a predetermined period T1 to T2, is called a short beacon (hereinafter, SB), and is for detecting the power reception apparatus 200. When the power reception apparatus 200 is arranged in the power supply apparatus 100, the power reception apparatus 200 can be detected (sensed) due to change in an impedance of the power supply antenna 104 and the like. In the case of FIG. 4A, the power reception apparatus 200 is not detected, and after SB is stopped at a time T2, SB is output again after a predetermined time (not illustrated). By repeating this periodically, it is possible to detect that the power reception apparatus 200 was arranged in the predetermined time.

FIG. 4B shows a case where the power reception apparatus 200 (an object considered as the power reception apparatus 200) is detected at a time T2'. Subsequent to SB, during a predetermined period T2' to T3, the power supply apparatus 100 outputs the second electrical power P2 that is slightly larger than the third electrical power P3 and is called a long beacon (hereinafter, LB). When the power reception apparatus 200 is arranged in the power supply apparatus 100, electrical power is supplied to the first communication unit 202 based on LB, and thus the power reception apparatus 200 transmits an advertisement signal (hereinafter, an ADV signal) from the first communication unit 202. The ADV signal indicates that the power reception apparatus 200 has a function compatible with wireless power supply, and includes identification information (ID) unique to the apparatus. In FIG. 4B, the ADV signal is not transmitted from the power reception apparatus 200 due to some cause, and LB is output during the predetermined period T2' to T3, and after that, output of LB is stopped. As such a cause, for example, a case is conceivable in which an object detected by the power supply apparatus 100 based on SB does not have a function compatible with wireless power supply. In addition, a case is similarly conceivable in which a coin or the like that is not a power reception apparatus is detected. Note that in FIG. 4B, not the time T2 but a time T2' is indicated since output of LB was started at the time T2' that is before the time T2, due to the power reception apparatus 200 having been detected before the time T2 when output of SB ends. After output of LB is stopped at a time T3, similar operations from SB output are repeated after a predetermined time.

FIG. 4C shows a case where a normal ADV signal was transmitted from the power reception apparatus 200 during the predetermined period T2' to After receiving the ADV signal at a time T3', the power supply apparatus 100 exchanges various types of information such as a parameter used for power supply control with the power reception apparatus 200 in order to perform authentication processing, and thus extends the output at the electrical power level of the second electrical power P2 to a time T4, and outputs LB. Lastly, the electrical power level is raised to the first electrical power P1 from the time T4 to a time T5 so as to perform desired power supply.

Here, the electrical power level of the second electrical power P2 will be outlined. The second electrical power P2 corresponds to the electrical power level of LB, and by the power supply apparatus 100 outputting LB, electrical power is supplied to the first communication unit 202 of the power reception apparatus 200, and first communication (transmission of the ADV signal) is enabled. Transmission of an ADV signal is a necessary condition for receiving power supply. Note that at the electrical power level of the third electrical power P3 of SB, power cannot be supplied to the first communication unit 202, and thus the ADV signal is not transmitted.

In addition, description has been given with reference to FIGS. 4A to 4C in which LB is output after the power reception apparatus 200 is detected (sensed) based on SB, but a power reception apparatus that cannot be detected based on SB exists, and thus it is possible that LB is output even when a power reception apparatus is not detected based on SB.

Figure 5:
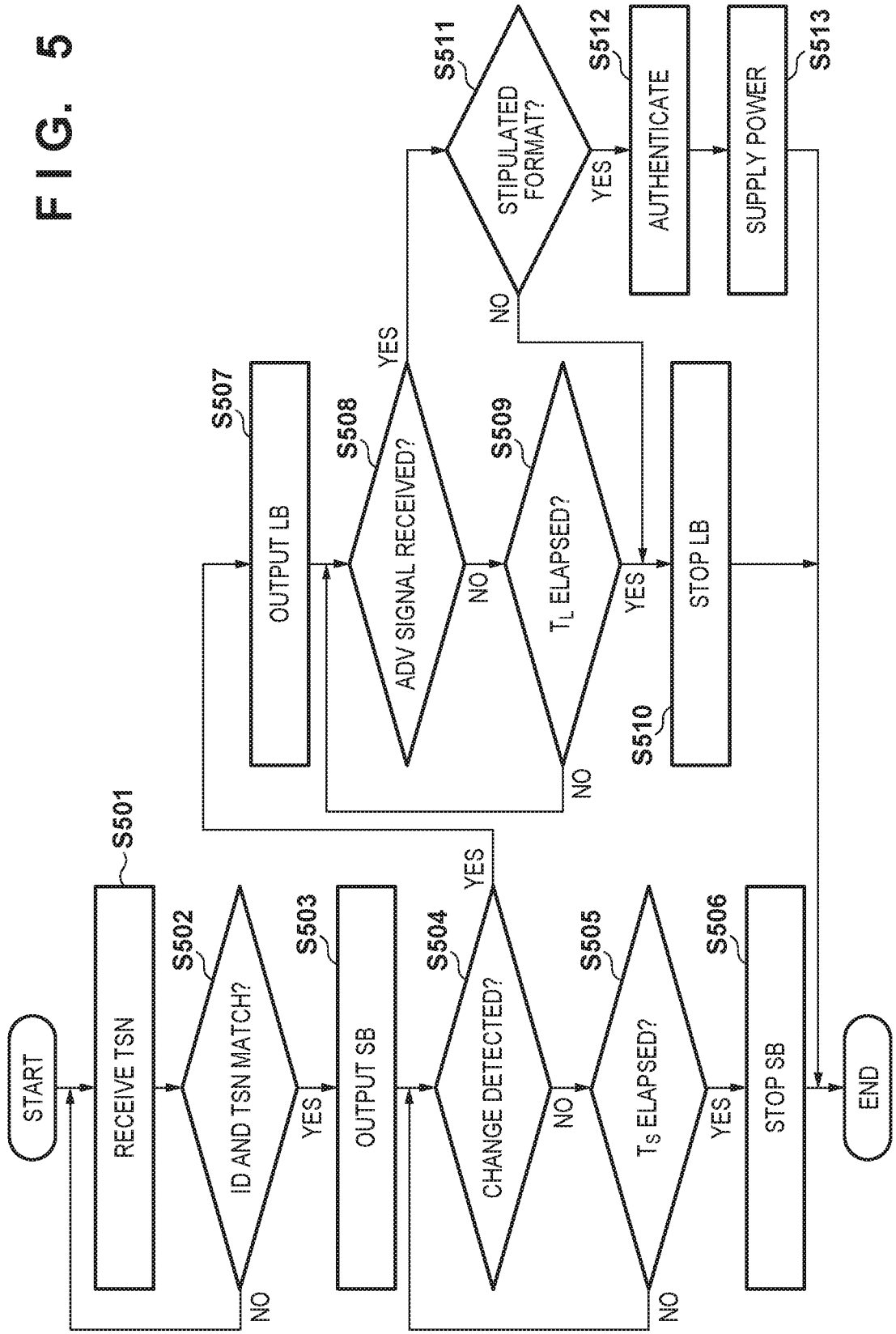
FIG. 5 is a flowchart showing power supply processing of the embodiment.

The basic flow of the power supply processing in a pair of the power supply apparatus 100 and the power reception apparatus 200 has been described above. FIG. 5 illustrates a case where a plurality of power supply apparatuses 100 are connected to the control apparatus 300, in other words, the operation of the power supply apparatus 100 in the case of FIG. 3A. Note that the operation in FIG. 5 is realized by the control unit 101 executing a program stored in the memory 106.

Figure 6:
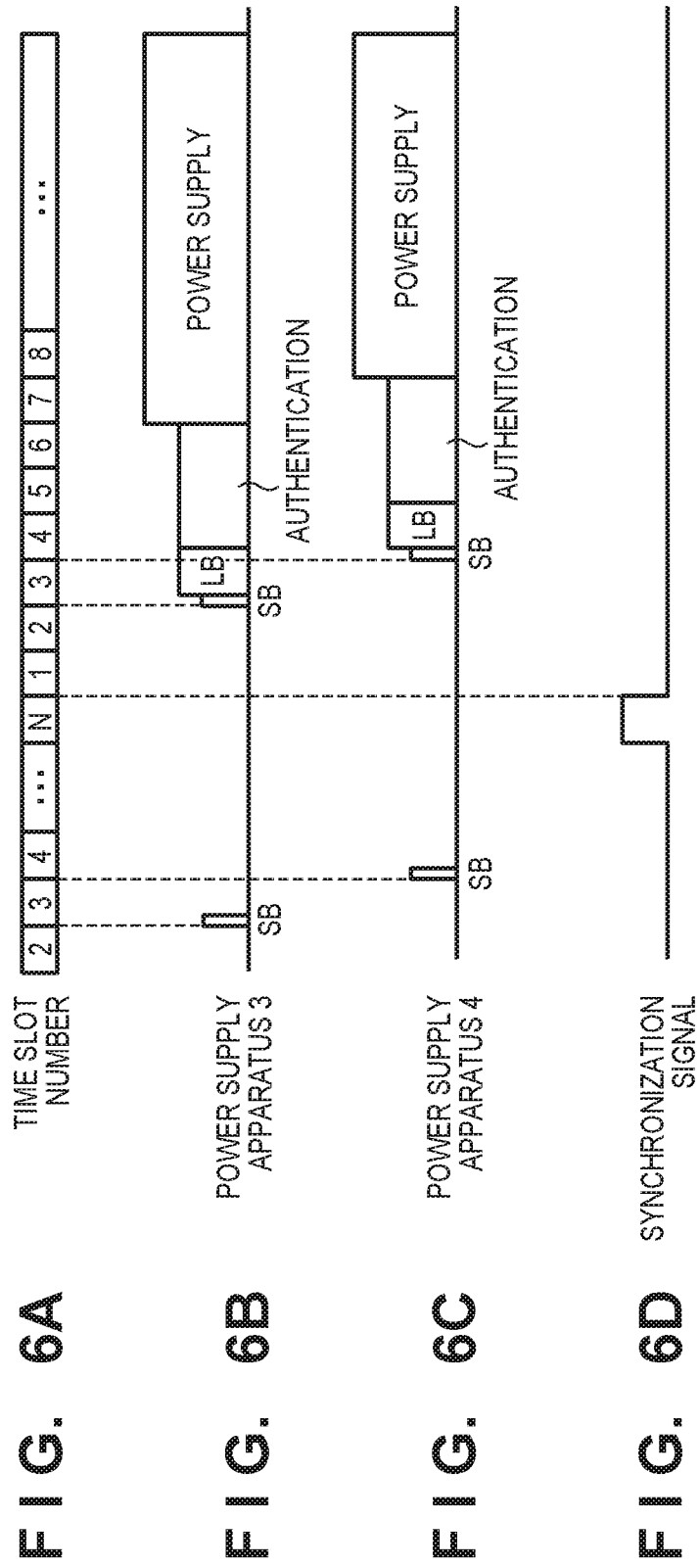
FIGS. 6A to 6D are time charts showing power supply processing of the embodiment.

In step S501, the control unit 101 receives a time slot number (hereinafter, TSN) transmitted from the control apparatus 300, using the second communication unit 105. As shown in FIG. 3A, numbers are assigned to the power supply apparatuses 100 in advance as unique identification information (ID), and stored in the memory 106. TSN is a control signal for repeating the IDs of the power supply apparatuses 100 connected to the control apparatus 300 for each predetermined period in order, and if the number of power supply apparatuses is N (N is a natural number), is a signal that is repeatedly output as 1, 2, 3, ..., N, 1, 2, for example. FIG. 6A shows an example of a time slot number.

In step S502, the control unit 101 compares STN received in step S501 and the ID stored in the memory 106, and if it is determined that STN and the ID match, advances the procedure to step S503, and if it is determined that STN and the ID do not match, returns the procedure to step S501, where the processing from step S501 is repeated. Accordingly, the power supply apparatus 100 is in a processing wait state until TSN that matches the ID of the power supply apparatus 100 is received.

In step S503, the control unit 101 outputs SB (the third electrical power P3) from the power supply antenna 104, and advances the procedure to step S504.

In step S504, the control unit. 101 determines whether or not a change in impedance or the like has been detected (sensed) in the power supply unit 103, and if it is determined that a change in impedance or the like has been detected, there is a high possibility that the power reception apparatus 200 is arranged, and thus advances the procedure to step S507, and if it is determined that a change in impedance or the like has not been detected, advances the procedure to step S505.

In step S505, the control unit 101 determines whether or not an SB output period started in step S503 exceeds a predetermined period TS. Determination of the SB output period is performed by setting and controlling the timer 107. If it is determined that the SB output period does not exceed the predetermined period TS, the control unit 101 returns the procedure to step S504, and if it is determined that the SB output period exceeds the predetermined period TS, advances the procedure to step S506.

In step S506, the control unit 101 stops output of SB, and ends the processing.

In step S507, the control unit 101 outputs LB (the second electrical power P2) from the power supply antenna 104, and advances the procedure to step S508. Note that electrical power is supplied to the first communication unit 202 of the power reception apparatus 200 during an LB output period, and first communication can be performed.

In step S508, the control unit 101 determines whether or not the first communication unit 102 has received an ADV signal from the power reception apparatus 200, and if it is determined that an ADV signal has been received, advances the procedure to step S511, and otherwise, advances the procedure to step S509.

In step S509, the control unit 101 determines whether or not the LB output period started in step S507 exceeds a predetermined period TL. Determination of the LB output period is performed by setting and controlling the timer 107. If it is determined that the LB output period does not exceed the predetermined period TL, the control unit 101 returns the procedure to step S508, and if it is determined that the LB output period exceeds the predetermined period TL, advances the procedure to step S510.

In step S510, the control unit 101 stops output of LB, and ends the processing.

In step S511, the control unit 101 analyzes the ADV signal received in step S508, and determines whether or not the ADV signal has a correct format stipulated for power supply. If it is determined that the ADV signal does not have a correct format, the control unit 101 advances the procedure to step S510, stops output of LB, and ends the processing. On the other hand, if it is determined that the ADV signal has a correct format, the control unit 101 advances the procedure to step S512. In this case, output of LB has not been stopped, and thus electrical power is continuously supplied to the first communication unit 202 of the power reception apparatus 200, and first communication can be performed.

In step S512, the control unit 101 exchanges various types of information such as a parameter used for power supply control, with the power reception apparatus 200, so as to execute mutual authentication processing, and when authentication ends (succeeds), advances the procedure to step S513.

In step S513, the control unit 101 raises the electrical power level of the second electrical power P2 to the first electrical power P1 and supplies power, and when determining to end power supply according to a conditon regarding whether or not the battery of the power reception apparatus 200 is fully charged, or the like, stops output from the power supply antenna 104, and ends the processing.

As described above, the power supply apparatus 100 outputs LB only in a case where TSN received from the control apparatus 300 matches the ID of the power supply apparatus 100, and thus even if there are a plurality of power supply apparatuses 100, exclusive control can be performed such that the power supply apparatuses 100 do not output LB at the same time. As a result, a plurality of ADV signals will not compete, and thus starting power supply to a power reception apparatus that is not a power supply target can be avoided.

Note that along with the above-described exclusive control of LB output, exclusive control is also performed with respect to SB output, but exclusive control of SB output is not a necessary condition, and for example, SB may be always output by the comparison between an ID and TSN being performed between step S504 and step S507.

FIGS. 6A to 6D show, as time charts, power supply processing described with reference to FIG. 5 in which two power supply apparatuses are used as examples, and the power supply apparatuses 3 and 4 corresponding to adjacent ID numbers 3 and 4 are illustrated in order to clearly indicate that control is performed such that LB output is not performed at the same time.

FIG. 6A shows time slot numbers (TSN) as control signals to be transmitted to all the power supply apparatuses 100 by the control apparatus 300. When the total number of power supply apparatuses is N (N is a natural number), the control apparatus 300 repeatedly transmits slots 1 to N in order. The time length each slot is set at least larger than or equal to the time length of LB. This setting is made such that LB that is set within each slot does not overlap other LB. Note that the time length of LB is indicated by a period T3-T2' in FIG. 4B.

FIG. 6B shows a time chart of the power supply apparatus 3 corresponding to a slot 3. In the first SB output (the slot 3), no power reception apparatus is detected, and LB is not output. After that, until the second SB is output (the slot 3), a power reception apparatus is arranged in the power supply apparatus 3, and thus LB is output. Due to this LB, electrical power is supplied from the power reception unit 203 of the power reception apparatus 200 to the first communication unit 202, and the power reception apparatus 200 transmits an ADV signal to the power supply apparatus 3. FIG. 6B shows a state where the processing advances to power supply through authentication between the power supply apparatus 3 and the power reception apparatus 200. In this manner, the power supply apparatus 3 outputs SB and LB during a period of the time slot number 3 that matches the ID number 3 of the power supply apparatus 3.

FIG. 6C shows a time chart of the power supply apparatus 4 corresponding to a slot 4. Similarly to the case of FIG. 6B, in the first SB output (the slot 4), a power reception apparatus is not detected, and in the second SB output, a power reception apparatus is detected. In addition, the power supply apparatus 4 outputs SB and LB during a period of the time slot number 4 that matches the ID number 4 of the power supply apparatus 4.

Here, a case in considered in which the power reception apparatuses 200 are respectively arranged in the power supply apparatus 3 and the power supply apparatus 4 substantially at the same time. For example, assume that the power reception apparatuses 200 are arranged substantially at the same time in the vicinity of a time slot number N in FIG. 6A. In this case, regarding the power supply apparatus 3 and the power supply apparatus 4, the time slot numbers for SB output for detecting the power reception apparatus 200 and LB output for supplying power to the first communication unit 202 of the power reception apparatus 200 are different. Therefore, a power reception apparatus 200 arranged in the power supply apparatus 3 and the power reception apparatus 200 arranged in the power supply apparatus 4 do not transmit an ADV signal at the same time.

Note that in FIGS. 6B and 6C, periods during which authentication processing of the power supply apparatus 3 and the power supply apparatus 4 overlap, but after a power supply apparatus receives an ADV signal, a power reception apparatus that is a power supply target is recognized, and thus interference does not occur. In addition, power supply periods also overlap, but a region in which power supply is possible between the power supply apparatus and the power reception apparatus is relatively small, and thus processing can be performed at the same time.

For ease of understanding, an example has been described with reference to FIGS. 6A to 6D in which ID numbers of power supply apparatus are adjacent numbers 3 and 4, but in the case of other combinations, exclusive control is performed with respect to output of LB (or an ADV signal) similarly. In addition, even in a case where power reception apparatuses are arranged respectively in two or more power supply apparatuses or all the N power supply apparatuses substantially at the same time, it is clear that similar control will be performed.

In addition, in the above description, both SB output and LB output are exclusively controlled, but as described with reference to FIG. 5, it is also possible to exclusively control only LB output, and output SB for each slot.

Note that the control apparatus 300 is configured such that TSN shown in FIG. 6A is transmitted to all the power supply apparatuses 100, but in place of TSN, as shown in FIG. 6D, a common synchronization signal may be transmitted to all the power supply apparatuses 100. In this case, the timer 107 is reset using, as a trigger, a synchronization signal received from the control apparatus 300 by each of the power supply apparatuses 100, and TSN in FIG. 6A is generated in the apparatus. With such a configuration, the control apparatus 300 can be further simplified.

In addition, although not illustrated, there is a method for using a clock circuit (real-time clock) in which a highly accurate crystal oscillator or the like is used, in place of the timer 107. By using a clock signal or a pulse signal for each predetermined time that is generated based on a highly accurate clock circuit, it becomes possible to increase the communication interval or reduce the frequency for synchronization (in this case, time adjustment). In particular, in a case where synchronization is performed by packet communication using a wired/wireless LAN, PLC or the like, a highly accurate clock circuit is effective because it is sufficient that synchronization packets are transmitted at an interval that is long to some degree.

Second Embodiment

Next, a second embodiment will be described.

In the first embodiment, time slot numbers are output from a control apparatus 300 to power supply apparatuses 100 so as to perform exclusive control such that the power supply apparatuses 100 do not output LB at the same time slot.

However, as the number of power supply apparatuses 100 increases, the time interval of time slots at which LB can be output for each power supply apparatus becomes long in proportion to the number of power supply apparatuses, and thus a time after a power reception apparatus 200 is arranged in the power supply apparatus 100 before power supply is started becomes long.

In view of this, in the second embodiment, processing for reducing a time until power supply is started even when the number of power supply apparatuses increases will be described.

Figure 7:
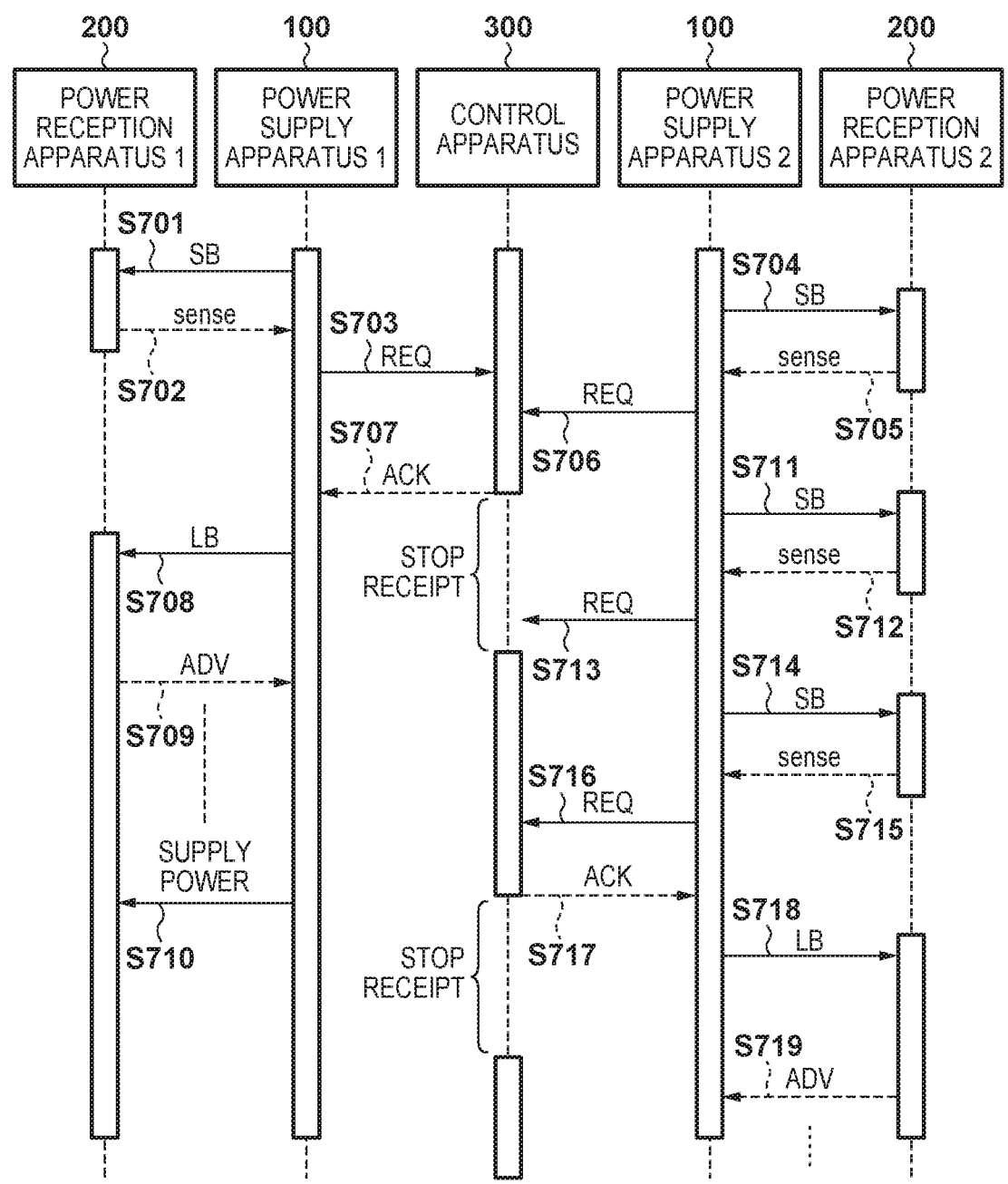
FIG. 7 is a sequence diagram of power supply processing of a second embodiment.

FIG. 7 is a sequence diagram showing the flow of power supply processing of this embodiment. Objects that are handled here are two power supply apparatuses 100, two power reception apparatuses 200, and the control apparatus 300. The processing in FIG. 7 is realized by the power supply apparatus 100, the power reception apparatus 200 and the control apparatus 300 causing control units 101, 201, and 301 to execute programs stored in memories 106, 206, and 306, respectively.

FIG. 7 shows a sequence in a case where a power reception apparatus 1 and a power reception apparatus 2 are respectively arranged in a power supply apparatus 1 and a power supply apparatus 2 substantially at the same time, and an example is shown in which the timing when the power reception apparatus 1 is arranged is slightly earlier.

In step S701, the power supply apparatus 1 outputs SB, and in step S702, it is detected (sensed) that the power reception apparatus 1 has been arranged. The power supply apparatus 1 will basically output LB, but here, before outputting LB, in step S703, an LB output request (REQ) is transmitted to the control apparatus 300. In addition, in steps S704, S705, and S706, similar processing is performed with respect to a pair of the power supply apparatus 2 and the power reception apparatus 2. REQ from the power supply apparatus 1 was slightly earlier, and thus the control apparatus 300 that received. REQ from the two power supply apparatuses 1 and 2 returns LB output approval (ACK) to the power supply apparatus 1 in step S707. In FIG. 7, an operation in which ACK is not returned to the power supply apparatus 2 is performed, but disapproval (NACK) may be returned.

The control apparatus 300 that transmitted ACK in step S707 stops receiving REQ during a predetermined period after that. The predetermined period is equivalent to an LB output period determined in advance. The power supply apparatus 1 that received ACK from the control apparatus 300 outputs LB in step S708. If the power reception apparatus 1 is the correct power reception apparatus, in step S709, an ADV signal is transmitted to the power supply apparatus 1 during the LB output period, authentication processing is performed, and after that, power supply to the power reception apparatus 1 is started in step S710.

The power supply apparatus 2, which is another power supply apparatus, transmitted REQ to the control apparatus 300 in step S706, but ACK is not returned, and thus output of LB is not performed. In step S711 after a predetermined time, the power supply apparatus 2 outputs SB again, and detects (senses) the power reception apparatus 2 in step S712 (at the second time).

Next, in, step S713, the power supply apparatus 2 transmits REQ to the control apparatus 300, but as described above, the control apparatus 300 has stopped receiving REQ during a predetermined period, and thus ACK is not returned. Furthermore, S714 after the predetermined period during which reception of REQ is stopped has elapsed, the power supply apparatus 2 outputs SB again, and detects (senses) the power reception apparatus 2 (at the third time) in step S715.

Next, in step S716, the power supply apparatus 2 transmits REQ to the control apparatus 300, and in step S717, receives ACK from the control apparatus 300. After that, similarly to steps S708 to S710, in step S718, the power supply apparatus 2 outputs LB to the power reception apparatus 2, and in step S719, an ADV signal is returned from the power reception apparatus 2, and power supply to the power reception apparatus 2 is started.

In this embodiment, an example has been described in which the number of power supply apparatuses is two, but processing can be performed similarly even in a case where the number of power supply apparatuses is three or more, and exclusive control can be performed such that LB is not output from three or more power supply apparatuses at the same time.

According to this embodiment, exclusive control or LB output from the power supply apparatus 100 to the power reception apparatus 200 is performed according to the timing when the power reception apparatus 200 was actually arranged in the power supply apparatus 100, and thus even in a case where the number of power supply apparatuses 100 is large, a time until power supply is started does not become long.

In the above-described non-contact power supply system, a configuration is adopted in which output of a long beacon (LB) is restricted according to a control signal received by power supply apparatuses, but a configuration may be adopted in which a switch is provided for each of the power supply apparatuses, and a mode in which a power supply function can be cancelled is prepared. Specifically, the mode is a mode in which on/off of the power supply function can be switched using a switch, and LB output is not restricted by a control signal. The mode is convenient in a case where a single power supply apparatus is to be used without incorporating a power supply apparatus in a system, in a case where the power supply function is tested, and the like.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above described embodiment(s). The computer may comprise one or more processors (e.g., central processing unit. (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical dish (such as a compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent. Application No. 2017-004605, filed Jan. 13, 2017 which is hereby incorporated by reference herein in its entirety.

What is claimed is:

1. A power supply apparatus which can supply electrical power to a power reception apparatus in a non-contact manner, the power supply apparatus comprising:
   a communication unit configured to be communicably connected to a control apparatus which is connected with a plurality of power supply apparatuses including the power supply apparatus;
   a power supply unit configured to be able to output first electrical power to be supplied to a power source of the power reception apparatus and second electrical power that is smaller than the first electrical power, and is to be supplied to a communication unit of the power reception apparatus; and
   a control unit configured to control output of the second electrical power based on a control signal that has been received from the control apparatus, and is for performing control such that the second electrical power is not output from the plurality of power supply apparatuses at the same time and is output from the plurality of power supply apparatuses in order.

2. The apparatus according to claim 1, wherein
   the control signal is a signal for limiting a period during which the power supply apparatus outputs the second electrical power, and
   if information indicated by a control signal received from the control apparatus corresponds to unique information provided to the power supply apparatus in advance, the control unit performs control so as to orderly output the second electrical power during a period corresponding to the control signal.

3. The apparatus according to claim 2, wherein
the control signal includes information indicating a time slot assigned to each power supply apparatus, and
the control unit performs control so as to orderly output the second electrical power during a period corresponding to a time slot of a control signal received from the control apparatus.

4. The apparatus according to claim 2, wherein
the control unit performs control so as to output, for each predetermined time, third electrical power that is smaller than the second electrical power, and is for detecting that a power reception apparatus exists in a range of a region in which power supply is possible, and
controls output of the third electrical power based on a control signal received from the control apparatus.

5. The apparatus according to claim 1, wherein
the control signal is a synchronization signal that is common to a plurality of power supply apparatuses, and
the control unit generates a period during which the second electrical power is output based on a synchronization signal received from the control apparatus, and performs control so as to orderly output the second electrical power during the generated period.

6. The apparatus according to claim 5, wherein
the synchronization signal is a pulse signal or a clock signal that is output for each predetermined time.

7. The apparatus according to claim 1, wherein
the power supply apparatus makes an inquiry to the control apparatus, and orderly outputs the second electrical power only in a case of approval, and
the control apparatus outputs approval only to one power supply apparatus during a predetermined period.

8. The apparatus according to claim 1, wherein
one of the plurality of power supply apparatuses operates as the control apparatus.

9. A control apparatus comprising:
a communication unit configured to communicate with a plurality of power supply apparatuses that can supply electrical power to respective power reception apparatuses in a non-contact manner; and
a control unit configured to output a control signal for performing control such that electrical power that is supplied in order to connect the power supply apparatuses to the respective power reception apparatuses is not output from the power supply apparatuses at the same time and is output from the power supply apparatuses in order.

10. The apparatus according to claim 9, wherein
the power supply apparatuses can each orderly outputs first electrical power that is to be supplied to a power source of the power reception apparatus and second electrical power that is smaller than the first electrical power, and is to be supplied to a communication unit of the power reception apparatus, and
the control signal is a signal for limiting a period during which each of the power supply apparatuses outputs the second electrical power.

11. The apparatus according to claim 10, wherein
the control signal is a signal for controlling a timing at which each of the power supply apparatuses orderly outputs the second electrical power.

12. The apparatus according to claim 11, wherein
the control signal includes information indicating a time slot assigned to each of the power supply apparatuses, and
the power supply apparatuses each orderly outputs the second electrical power during a period corresponding to a time slot of a control signal received from the control apparatus.

13. The apparatus according to claim 10, wherein
the control signal is a synchronization signal that is common to a plurality of power supply apparatus, and
the power supply apparatuses each generates a period during which power supply to the power reception apparatus is started, based on a synchronization signal received from the control apparatus, and orderly outputs the second electrical power during the generated period.

14. The apparatus according to claim 13, wherein
the synchronization signal is a pulse signal or a clock signal that is output for each predetermined time.

15. The apparatus according to claim 10, wherein
the control unit outputs approval or disapproval in response to a request for outputting the second electrical power received from the power supply apparatus, and
outputs approval only to a single power supply apparatus during a predetermined period.

16. The apparatus according to claim 10, wherein
the power supply apparatuses can each output, for each predetermined time, third electrical power that is smaller than the second electrical power, and is for detecting that a power reception apparatus exists in a range of a region in which power supply is possible, and
the control signal is a signal for limiting a period during which the power supply apparatuses output the third electrical power.

17. A control method of a power supply apparatus which can output, in a non-contact manner, first electrical power to be supplied to a power source of a power reception apparatus and second electrical power that is smaller than the first electrical power, and is to be supplied to a communication unit of the power reception apparatus, the method comprising:
communicating with a control apparatus which is connected with a plurality of power supply apparatuses including the power supply apparatus, and
controlling output of the second electrical power based on a control signal that has been received from the control apparatus, and is for performing control such that the second electrical power is not output from the plurality of power supply apparatuses at the same time and is output from the plurality of power supply apparatuses in order.

18. A control method of a control apparatus which controls a plurality of power supply apparatuses that can supply electrical power to respective power reception apparatuses in a non-contact manner, the method comprising:
communicating with the plurality of power supply apparatuses; and
outputting a control signal for performing control such that electrical power that is supplied in order to connect the power supply apparatuses to the respective power reception apparatuses is not output from the power supply apparatuses at the same time and is output from the power supply apparatuses in order.

19. A non-transitory computer-readable storage medium storing a program for causing a computer to function as a power supply apparatus which can supply electrical power to a power reception apparatus in a non-contact manner, the power supply apparatus comprising:

a communication unit configured to be communicably connected to a control apparatus which is connected with a plurality of power supply apparatuses including the power supply apparatus;

a power supply unit configured to be able to output first electrical power to be supplied to a power source of the power reception apparatus and second electrical power that is smaller than the first electrical power, and is to be supplied to a communication unit of the power reception apparatus; and a control unit configured to control output of the second electrical power based on a control signal that has been received from the control apparatus, and is for performing control such that the second electrical power is not output from the plurality of power supply apparatuses at the same time and is output from the plurality of power supply apparatuses in order.

20. A non-transitory computer-readable storage medium storing a program for causing a computer to function as a control apparatus comprising:

a communication unit configured to communicate with a plurality of power supply apparatuses that can supply electrical power to respective power reception apparatuses in a non-contact manner; and a control unit configured to output a control signal for performing control such that electrical power that is supplied in order to connect the power supply apparatuses to the respective power reception apparatuses is not output from the power supply apparatuses at the same time and is output from the power supply apparatuses in order.

* * * * *